Patented Aug. 9, 1932

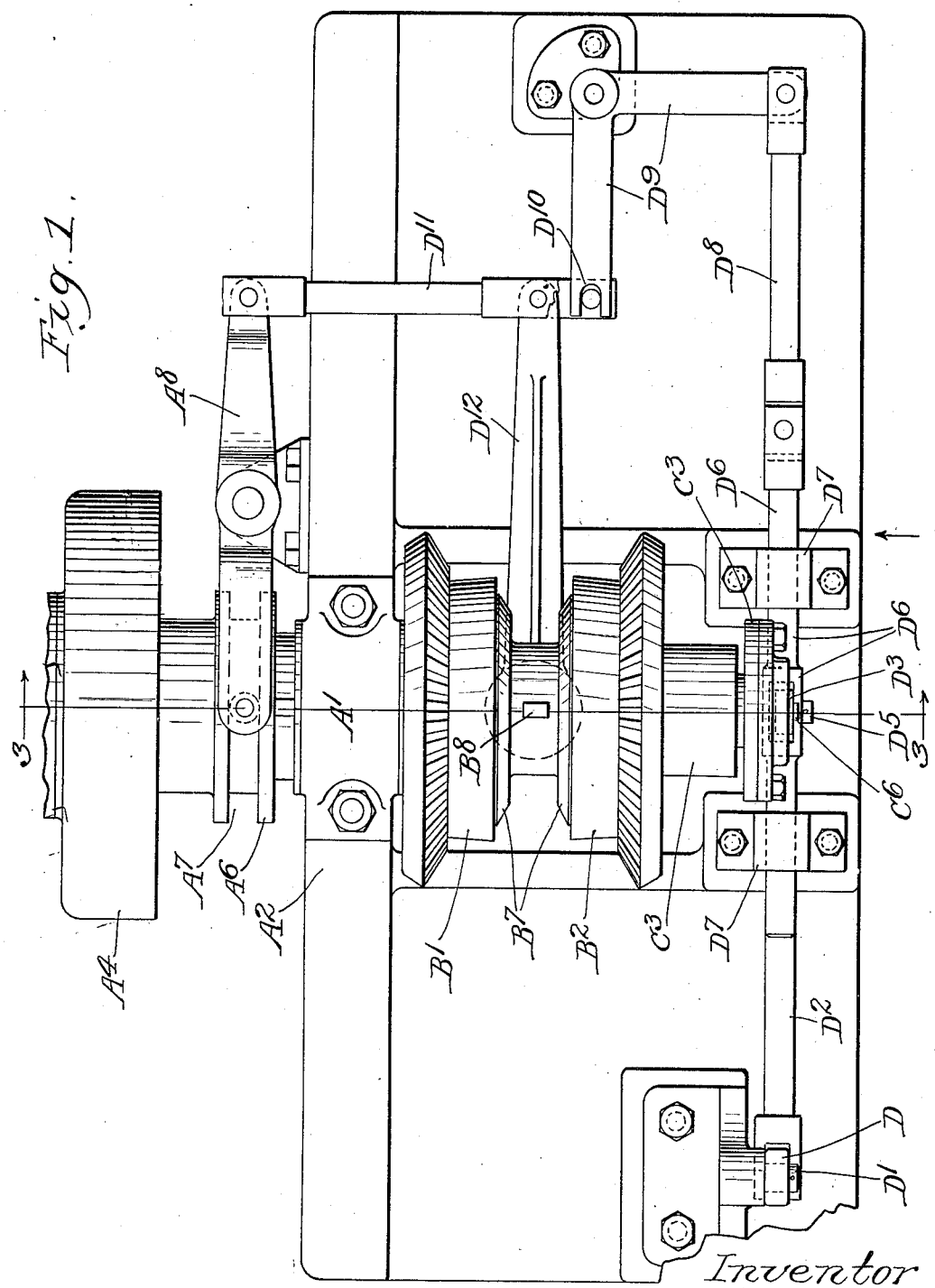

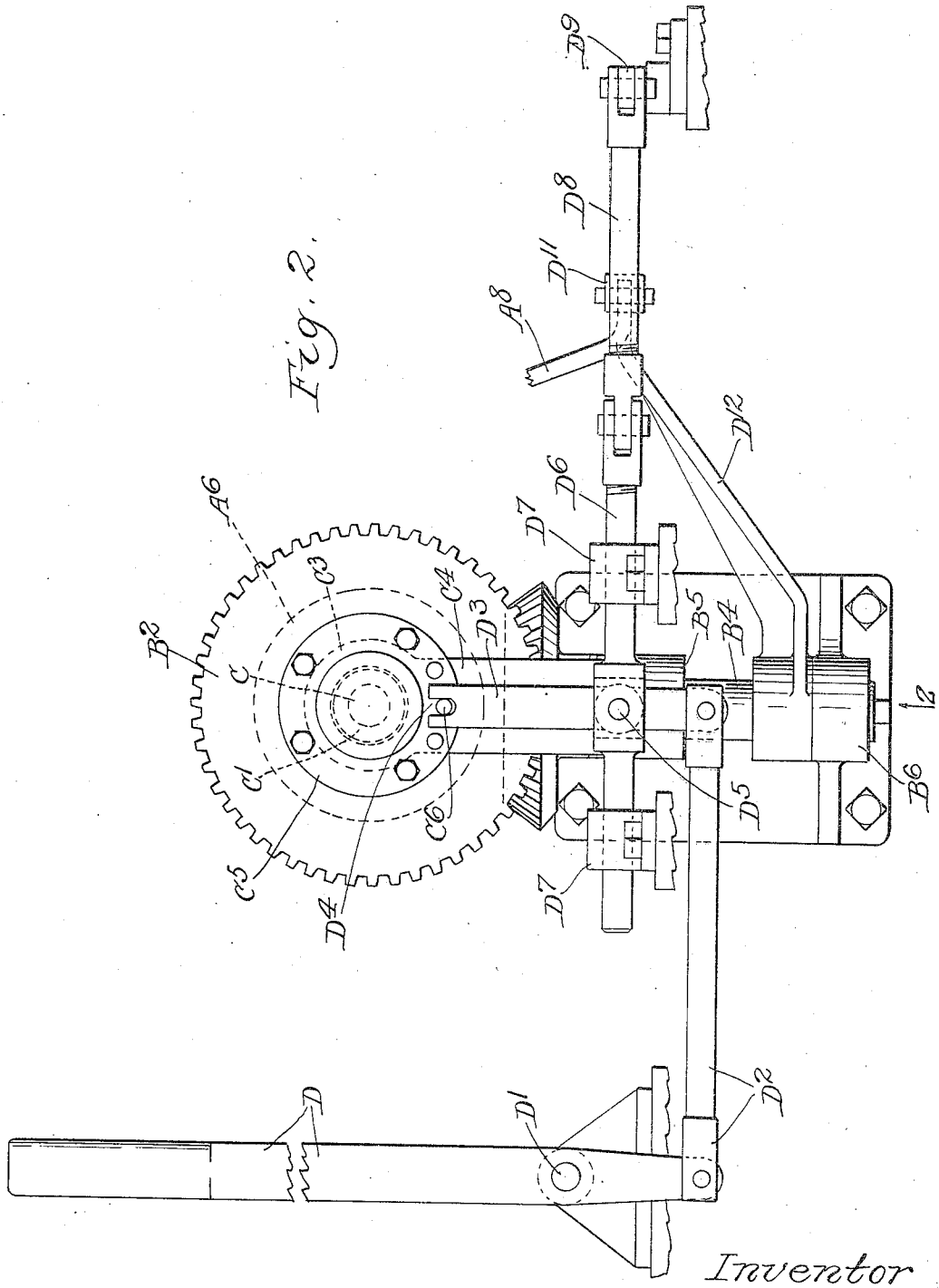

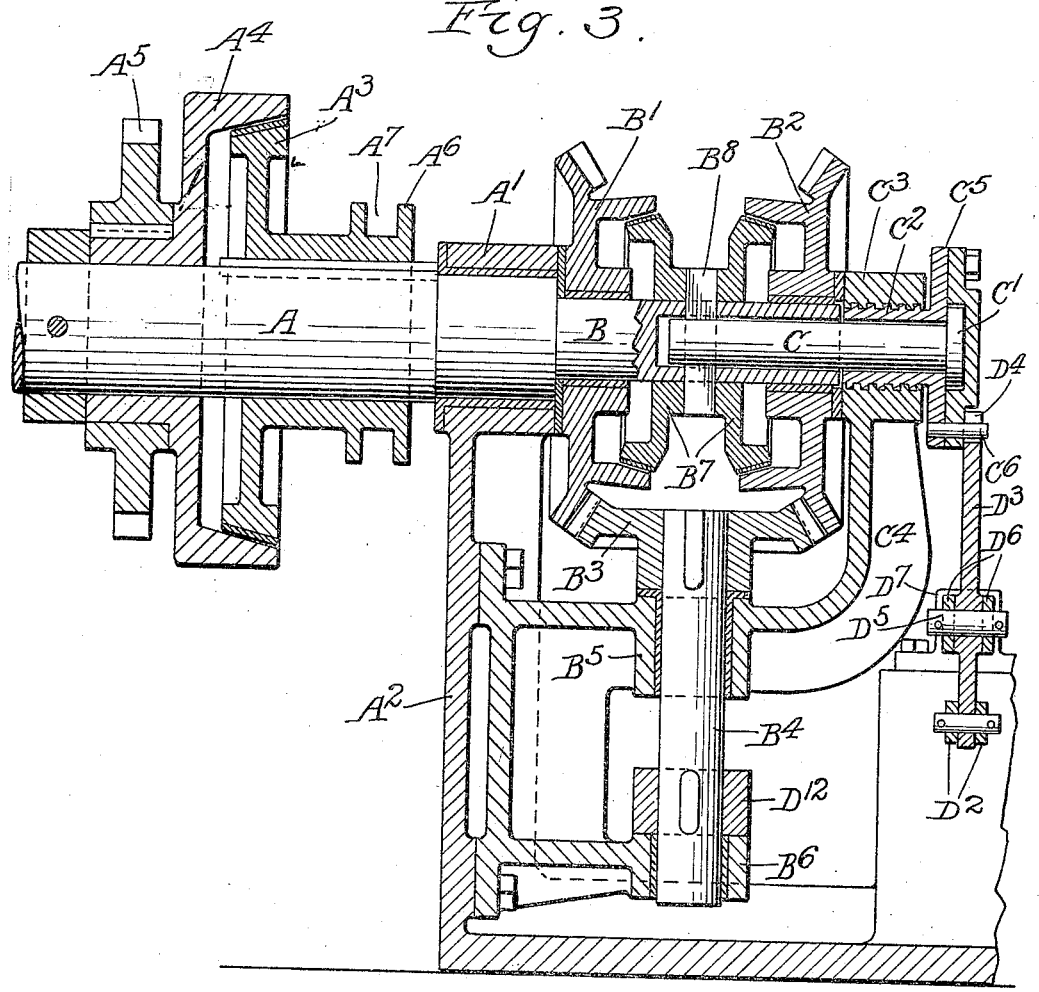

1,871,049

UNITED STATES PATENT OFFICE

ASGER EILERSGAARD, OF CHICAGO, ILLINOIS, ASSIGNOR TO LINK-BELT COMPANY, OF CHICAGO, ILLINOIS, A CORPORATION OF ILLINOIS

DOUBLE ACTING AUXILIARY CLUTCH

Application filed June 8, 1929. Serial No. 369,378.

My invention relates to a double-acting auxiliary clutch, and has for one object to provide a new and improved form of clutch control mechanism whereby positive mechanically operated means under the control of the operator are provided to enable the operator by mechanical means quite independent of his own strength, to operate a clutch. My invention is especially adapted for use in connection with the type of clutch where substantially as much force is required to disengage as to engage the clutch.

Among the objects of my invention, then, are to provide power controlled means for engaging and disengaging a clutch or other mechanism, to provide such means wherein the degree of engagement or disengagement is at all times controlled by the operator, to provide a clutch control mechanism wherein the operation during the entire engaging and disengaging cycle is under the positive control of the operator but is altogether independent of the strength which the operator himself is able to apply to the work.

My invention is illustrated more or less diagrammatically in the accompanying drawings, wherein—

Figure 1 is a plan view;

Figure 2 is a side elevation looking in the direction of the arrow in Figure 1;

Figure 3 is a side elevation looking in the direction of the arrow shown in Figure 2 with parts in section.

Like parts are indicated by like characters throughout the specifications and drawings.

A is the driving shaft driven by any suitable means not here shown, mounted for rotation in the bearing $A^1$ on the supporting bracket $A^2$. Mounted on the shaft A is a driving member $A^3$, splined or otherwise longitudinally movable therealong, but held against rotation thereabout. Associated with it is a driven member $A^4$ held against longitudinal movement with respect to the shaft, but free to rotate thereabout. This driven member transmits power through any suitable means, as, for instance, the gear $A^5$.

Associated with the movable clutch member is the hub $A^6$ annularly slotted at $A^7$ and adapted to be engaged by the pivotally mounted clutch-shifting lever $A^8$ to move the clutch into and out of a driving position.

B is the auxiliary clutch extension end of the main shaft A. It has rotatably mounted thereon the opposed combined bevelled gears and cones $B^1$ $B^2$. Each of these gears are simultaneously in mesh with a bevelled gear $B^3$, mounted on the vertical shaft $B^4$ in bearings $B^5$ $B^6$ which are supported on the bracket $A^2$. Mounted on the extension B between the combined bevelled gears and cones $B^1$ $B^2$ is the double cone $B^7$, held against rotation with respect to the shaft B by the driving key $B^8$, but free to move longitudinally of the shaft to engage with one or other of the combined bevelled gears and cones to cause the shaft $B^4$ to rotate in one direction or the other.

The engaging movement of the double cone is provided by a shaft C, extending longitudinally within the hollow end of the shaft B, engaging the key $B^8$ and extending out to the end of the shaft B, where it terminates in a head $C^1$. Interposed between the end of the shaft B and the head $C^1$ is a threaded sleeve $C^2$, in mesh with a nut $C^3$ on the bracket $C^4$. This screw carries a flange $C^5$, which surrounds the head $C^1$ so that the sleeve $C^2$ and the shaft C are free to rotate with respect one to the other, but are constrained to move longitudinally in unison. Projecting outwardly from the member $C^5$ at the bottom is a drive pin $C^6$, whereby rotation may be imparted to the screw $C^2$ to bring one or the other of the combined bevelled gears and cones into action to drive the shaft $B^4$ in the forward or reverse direction.

D is a hand lever for control by the operator of the clutch. It is pivoted at $D^1$; pivoted on the short arm of the lever is a link $D^2$. The other end of this link $D^2$ is pivoted on the lower end of a floating lever $D^3$, slotted at its upper end at $D^4$ to engage the pin $C^6$. This lever is fulcrumed at $D^5$ on the sliding bar $D^6$, which slides in the bearings $D^7$. $D^8$ is a link interposed between the end of the sliding bar $D^6$ and the bell-crank lever $D^9$. The other end of this bell crank lever is slotted at $D^{10}$ to engage the end of the shifting link $D^{11}$, which in turn is pivoted on the lever $A^8$. $D^{12}$ is a drive lever rigidly mounted on the shaft $B^4$ and pivoted on the link $D^{11}$.

It will be evident that while I have shown in my drawings and specification an operating device that still many changes might be made in the specification and claims without departing materially from the spirit of my invention, and I wish therefore that my drawings be regarded as in a sense diagrammatic. It will be especially obvious that where I have shown my auxiliary clutch or driving mechanism applied to the actuation of a main clutch, that such actuating mechanism might be equally well applied to any other situation where such an actuating device is appropriate.

The use and operation of my invention are as follows:

With the parts in the position shown in the drawings, the floating link $D^3$ is vertical. The lever D is in the neutral position and the double cone is in the separate position and nothing happens.

If, now, the operator moves his hand lever forward he draws the floating lever at its lower end towards the left, rotating the screw in a counter clockwise direction. This pulls out on the double cone, causes the right hand combined bevelled gear and cone to rotate and, depending upon the direction of the rotation of the shaft A, rotates the power lever $D^{12}$ to positively rotate the clutch operating lever. But because the power lever and the clutch operating lever are tied up by means of the bell crank lever and the sliding shaft with the fulcrum of the floating link, the fulcrum moves forward tending to restore the floating link to the vertical position, and tending to throw the auxiliary clutch out. As long as the operator continues to press forward on his hand lever this movement of the fulcrum of the floating lever is prevented or compensated for, and the auxiliary clutch remains in. As soon as the operator stops movement of his lever, the mechanism catches up, the floating link becomes vertical, and the auxiliary clutch disengages.

Movement in the opposite direction is caused by opposite manipulation of the hand lever back to the starting position, and if desired, beyond it in the reverse direction.

It will be noted thus, that the hand lever merely serves to control the power; that the effect on the main clutch of the strength of the operator is absent or at least negligible, and the auxiliary clutch delivers power to operate the main clutch in either direction under controlled conditions by the hand of the operator.

I claim:

1. In combination, a main clutch, an auxiliary clutch, a single source of power for both of them, main clutch operating means controlled by the auxiliary clutch, a hand lever adapted to control the auxiliary clutch and an operating connection between it and such clutch movable independent of lever movement and responsive to movement of the main clutch operating means, the auxiliary clutch being adapted to positively move the main clutch both into and out of the driving position.

2. In combination, a main clutch, an auxiliary clutch, a single source of power for both of them, main clutch operating means controlled by the auxiliary clutch, a hand lever adapted to control the auxiliary clutch and an operating connection between it and such clutch movable independent of lever movement and responsive to movement of the main clutch operating means, the movement of said operating connection tending to discontinue the controlling movement of the auxiliary clutch.

3. In combination, a main clutch, an auxiliary clutch, a single source of power for both of them, main clutch operating means controlled by the auxiliary clutch, a hand lever adapted to control the auxiliary clutch and an operating connection between it and such clutch movable independent of lever movement and responsive to movement of the main clutch operating means, the movement of said operating connection tending to discontinue the controlling movement of the auxiliary clutch, further movement of the hand lever being adapted to counteract such discontinuing tendency.

4. In combination, a main clutch, an auxiliary clutch, a single source of power for both of them, main clutch operating means controlled by the auxiliary clutch, a hand lever adapted to control the auxiliary clutch and an operating connection between it and such clutch movable independent of lever movement and responsive to movement of the main clutch operating means, the movement of said operating connection tending to discontinue the controlling movement of the auxiliary clutch, the auxiliary clutch being adapted to positively move the main clutch both into and out of the driving position.

5. In combination, a main clutch, an auxiliary clutch, a single source of power for both of them, main clutch operating means controlled by the auxiliary clutch, a hand lever adapted to control the auxiliary clutch and an operating connection between it and such clutch movable independent of lever movement and responsive to movement of the main clutch operating means, the movement of said operating connection tending to discontinue the controlling movement of the auxiliary clutch, further movement of the hand lever being adapted to counteract such discontinuing tendency, the auxiliary clutch being adapted to positively move the main clutch both into and out of the driving position.

6. In combination with a main clutch, an auxiliary clutch, an operating means for the main clutch adapted to be actuated by the auxiliary clutch, a hand control for the auxiliary clutch and a connection between the hand control and the main clutch operating means adapted to cause automatic discontinuance of auxiliary clutch operation resultant from the operation of the main clutch in response to the auxiliary clutch.

7. In combination with a main clutch, an auxiliary clutch, an operating means for the main clutch adapted to be actuated by the auxiliary clutch, a hand control for the auxiliary clutch and a connection between the hand control and the main clutch operating means adapted to cause automatic discontinuance of auxiliary clutch operation resultant from the operation of the main clutch in response to the auxiliary clutch, further movement of the hand control being adapted to overcome such automatic discontinuing action.

8. In combination with a main clutch, an auxiliary clutch, an operating means for the main clutch adapted to be actuated by the auxiliary clutch, a hand control for the auxiliary clutch and a connection between the hand control and the main clutch operating means adapted to cause automatic discontinuance of auxiliary clutch operation resultant from the operation of the main clutch in response to the auxiliary clutch, further movement of the hand control being adapted to overcome such automatic discontinuing action, the auxiliary clutch being adapted dependent upon the direction of the movement of the hand lever to move the main clutch positively, into and out of driving position.

9. A clutch control comprising a hand lever, a floating lever, a link connecting them, a cross head upon which the floating lever is pivoted, an auxiliary clutch adapted to be controlled by movement of the free end of the floating lever, a driving member moved by the auxiliary clutch, a main clutch and a driving connection between the driving member and such main clutch and a driving connection between the cross head and the driving member and main clutch whereby movement of the driving connection displaces the pivot on which the floating lever is mounted.

Signed at Chicago county of Cook and State of Illinois, this 28th day of May, 1929.

ASGER EILERSGAARD.